United States Patent [19]

Dunfield et al.

[11] Patent Number: 5,659,215
[45] Date of Patent: Aug. 19, 1997

[54] SMALL FORM FACTOR ACTUATOR FOR IMPROVED FUNCTIONALITY AND LINEARITY

[75] Inventors: John C. Dunfield, Santa Cruz; Gunter K. Heine, Aptos, both of Calif.

[73] Assignee: Seagate Technology, Inc., Scotts Valley, Calif.

[21] Appl. No.: 486,391

[22] Filed: Jun. 7, 1995

Related U.S. Application Data

[63] Continuation-in-part of Ser. No. 246,853, May 19, 1994, Pat. No. 5,459,362.

[51] Int. Cl.$^6$ .................................................. H02K 33/18
[52] U.S. Cl. .............................. 310/154; 310/13; 335/296
[58] Field of Search .................................. 310/12, 13, 29, 310/36, 154, 156, 143; 360/98.07, 99.04, 99.08, 99.09, 99.11, 105, 106, 107, 108, 109; 335/296, 297, 304

[56] References Cited

U.S. PATENT DOCUMENTS

| | | | |
|---|---|---|---|
| 4,908,816 | 3/1990 | Champagne et al. | 369/215 |
| 5,034,837 | 7/1991 | Schmitz | 360/105 |
| 5,119,253 | 6/1992 | Kotani | 360/106 |
| 5,122,702 | 6/1992 | Nakazato | 310/13 |
| 5,122,703 | 6/1992 | Takahashi et al. | 310/36 |
| 5,168,184 | 12/1992 | Umehara et al. | 310/13 |
| 5,175,457 | 12/1992 | Vincent | 310/15 |
| 5,193,037 | 3/1993 | Pace | 360/106 |
| 5,235,482 | 8/1993 | Schmitz | 360/97.02 |
| 5,254,914 | 10/1993 | Dunfield et al. | 318/254 |
| 5,260,618 | 11/1993 | Dunfield et al. | 310/154 |
| 5,313,159 | 5/1994 | Allwine | 324/207.2 |
| 5,315,464 | 5/1994 | Tsujino | 360/99.08 |
| 5,396,388 | 3/1995 | Brown | 360/106 |
| 5,424,591 | 6/1995 | Kuriyama | 310/12 |
| 5,459,359 | 10/1995 | Umehara | 310/13 |
| 5,486,965 | 1/1996 | Yoshida et al. | 360/106 |

FOREIGN PATENT DOCUMENTS

| | | | |
|---|---|---|---|
| 2403-675 | 5/1979 | France | 310/154 |
| 55-88559 | 7/1980 | Japan | 310/154 |
| 0139304 | 6/1987 | Japan | 335/296 |
| 62-139304 | 6/1987 | Japan | 335/296 |
| 1-206605 | 8/1989 | Japan | 335/296 |
| 13273857 | 12/1991 | Japan | 310/13 |
| 3-273857 | 12/1991 | Japan | 310/13 |

OTHER PUBLICATIONS

Article: "Moving Coil VCM: Feasibility Study of an Alternative Design", John Dunfield and Kamran Oveyssi, date unknown. (In Parent Case).

*Primary Examiner*—Thomas M. Dougherty
*Attorney, Agent, or Firm*—LaRiviere, Grubman & Payne

[57] ABSTRACT

A voice coil motor (VCM) for a small form factor hard disk drive having a contoured flux field in the air gap wherein adjoining regions of oppositely directed magnetic flux form a transition zone. In the preferred embodiment, the magnetic structure assembly is contoured or shaped. The magnetic structure assembly comprises pole pieces and magnets. The shaping may be of either of the pole pieces or of either of the magnets. The shaping may be along the top edge only, along the bottom edge only, or along both edges. Alternatively, the shaping may be accomplished in the transverse plane, that is by shaping the profile in thickness. The shaping can be done so that when the flux is falling in one gap it is rising in the other gap. In this manner, the sum of the flux in the two gaps remains the same.

11 Claims, 16 Drawing Sheets

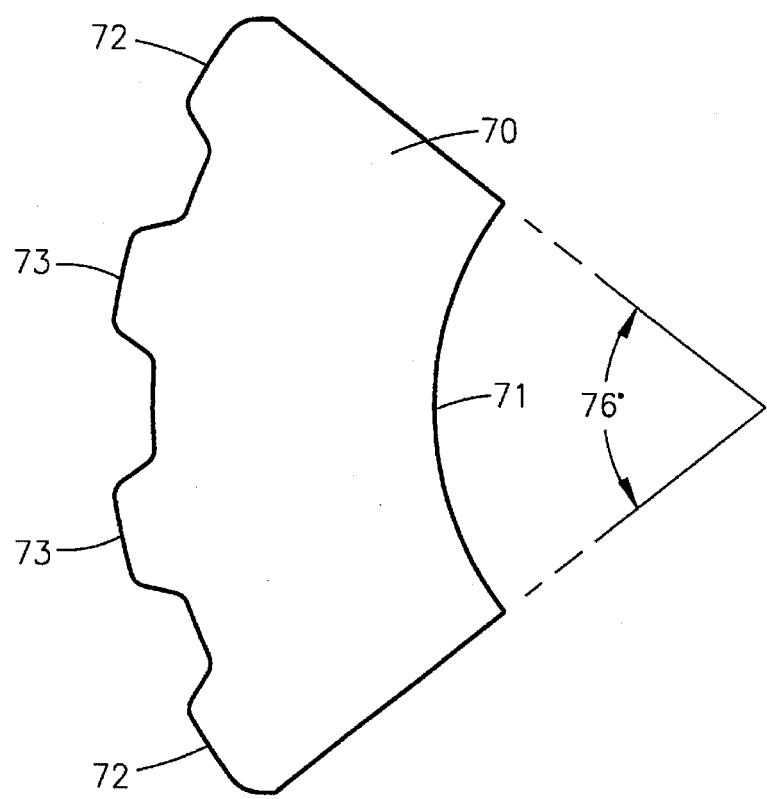
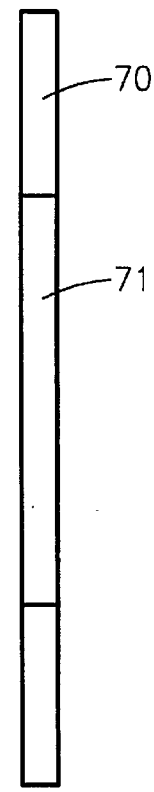
FIG. 13
FIG. 14
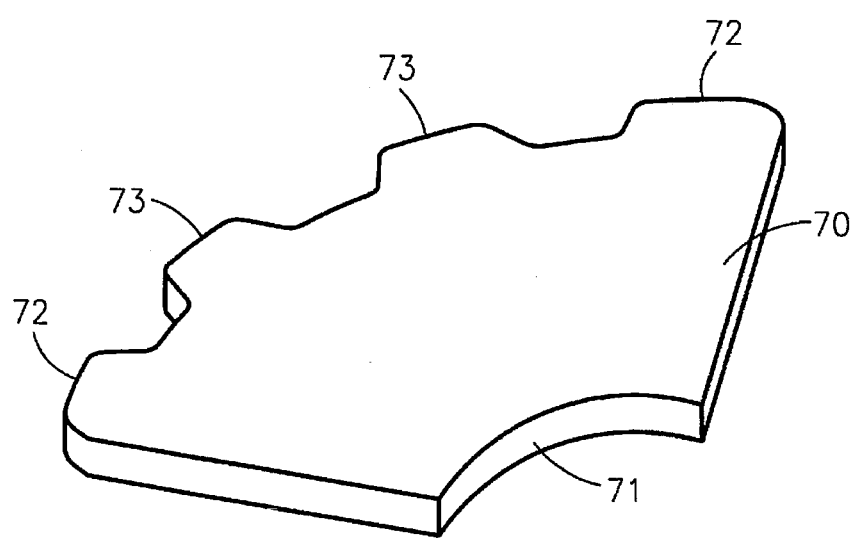
FIG. 15

SMALL FORM FACTOR ACTUATOR FOR IMPROVED FUNCTIONALITY AND LINEARITY

This application is a continuation-in-part of prior patent application Ser. No. 08/246,853, filed on May 19, 1995, now U.S. Pat. No. 5,459,362.

TECHNICAL FIELD

The present invention relates to improved actuators for disk drives and, more particularly, to improved voice coil motors used to actuate head arm assemblies in small form factor hard disk drives.

BACKGROUND ART

Magnetic disk drives are becoming increasingly smaller in order to meet the portability requirements of lap-top and notebook computers. Space is at a premium in all dimensions, and particularly in the height dimension.

One approach to overcoming problems associated with making a small actuator for small form factor magnetic disk drives is shown in U.S. Pat. No. 5,260,618 of Dunfield and Heine, and assigned to the assignee of the present invention. This prior patent is entitled "Space Optimization Voice Coil Motor For Disc Drives", and relates to shaping the poles and magnets of the actuator in a manner such that a large and constant magnetic flux field strength is provided over a given area. Although U.S. Pat. No. 5,260,618 discloses and claims a number of new and useful embodiments of voice coil motors, the present application provides some further improvements thereover.

DISCLOSURE OF INVENTION

The basic configuration of a voice coil motor (VCM) comprises a moving coil bobbin and a magnet. The magnet is typically bipolar with a transition zone in the center. In accordance with the principles of the present invention, there is provided a shaping of the flux in the air gap in the transition zone to achieve improved linearity. This shaping of the flux reduces the width of the transition zone. In addition, the flux is shaped such that it is falling on one side and rising on the other side. When the falling and rising flux is added, there is a compensation that results in a linear flux density.

In the preferred embodiment, the magnetic structure assembly is contoured or shaped. The magnetic structure assembly comprises pole pieces and magnets. In accordance with the present invention, the shaping may be of either of the pole pieces or of either of the magnets. The shaping may be along the top edge only, along the bottom edge only, or along both edges. Alternatively, the shaping may be accomplished in the transverse plane, that is by shaping the profile in thickness. The shaping can be done so that when the flux is falling in one gap it is rising in the other gap. In this manner, the sum of the flux in the two gaps remains the same.

In a first alternative embodiment, a protrusion is provided in the gap. This reduces the reluctance and also narrows the transition zone. The air gap is reduced in the center or transition zone by shaping a pole piece and a magnet. Material protrudes but does not interfere with the tolerances of the bobbin air gap, and yet the protruding material can act as a crash stop. This crash stop is provided in a location that would otherwise be unused. The protrusion provides an internal, integral crash stop that allows space for the stroke.

In a variation of this alternative embodiment, protrusions may be provided at the edge or ends of the pole piece, as well. Similarly, the magnet can be extended, if desired. One approach is to use magnets as stand-offs. To make a larger flux zone which is constant, the flux is shaped so that if the flux at one side drops, the flux at the other side rises to provide compensation. If desired, separate magnets can be installed. These added magnets can be very inexpensive.

In another embodiment, the reluctance path can be made longer. This can be implemented by adding an extra air gap. It may also be implemented by profiling the magnetizer apparatus so that it magnetizes the magnet with a built-in profile.

Other features of the present invention are disclosed or apparent in the section entitled "BEST MODE FOR CARRYING OUT THE INVENTION."

BRIEF DESCRIPTION OF DRAWINGS

For a fuller understanding of the present invention, reference is made to the accompanying drawing taken in conjunction with the following detailed description of the Best Mode For Carrying Out The Invention. In the drawing:

FIG. 13 is a plan view of another embodiment of a VCM magnet that has been profiled or contoured in accordance with the invention in order to shape the flux pattern thereof.

FIG. 14 is a side view of the contoured VCM magnet shown in plan view in FIG. 13.

FIG. 15 is a perspective view of the contoured VCM magnet shown in FIGS. 13 and 14.

Figure 1:
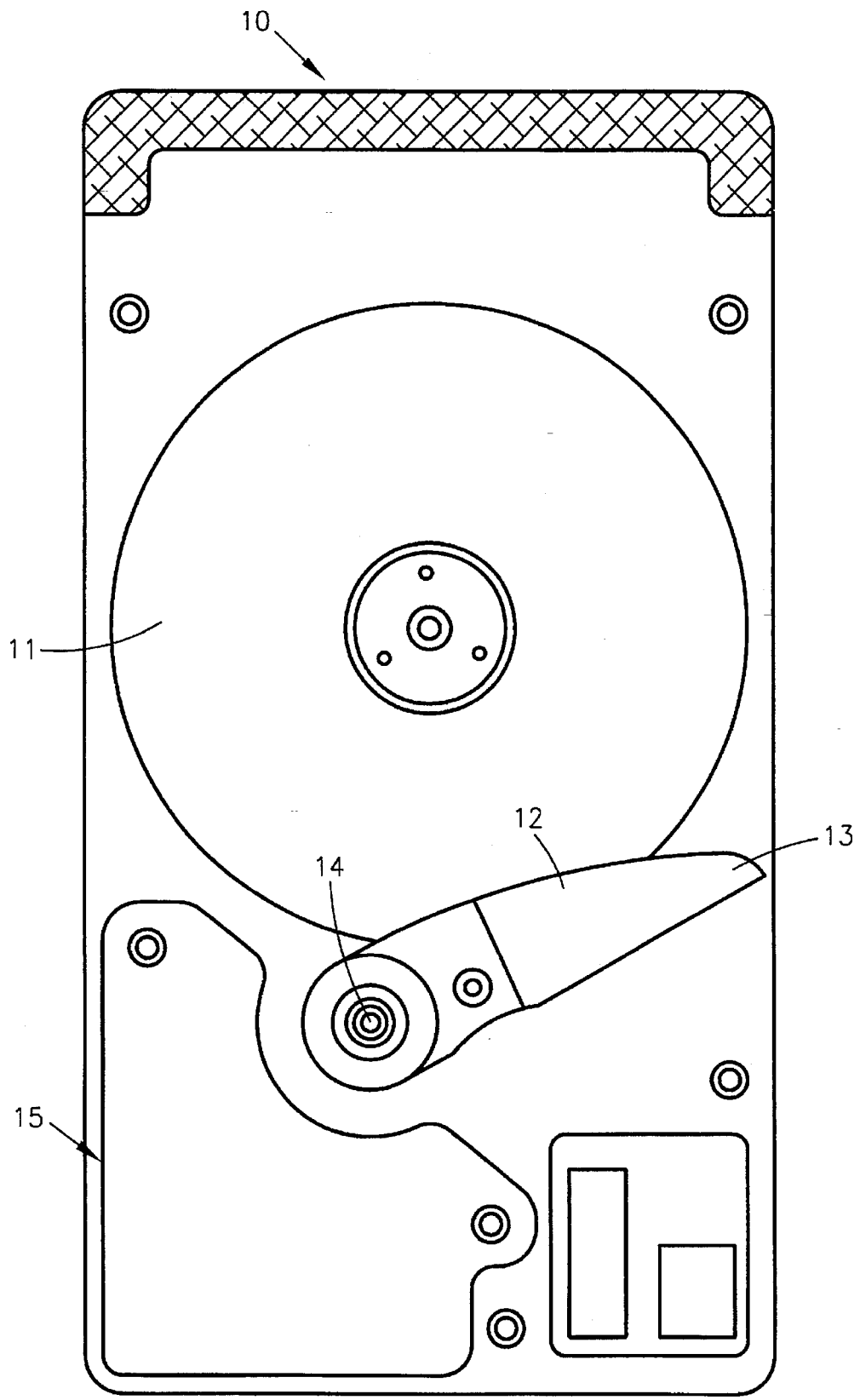
FIG. 1 is a perspective view of a small form factor hard disk drive assembly that includes a voice coil motor (VCM) actuator as a part thereof.

Reference numbers refer to the same or equivalent parts of the present invention throughout the several figures of the drawing.

BEST MODE FOR CARRYING OUT THE INVENTION

As hard disk drives, disk surfaces, servocontrol systems, VCM actuators, and read/write heads are all known in the art, in order to avoid confusion while enabling those skilled in the art to practice the claimed invention, this specification omits many details with respect to those items.

Referring now to FIG. 1, there is provided a small form factor hard disk drive assembly 10 of the type that may be used in a portable lap-top or notebook computer (not shown). Such hard disk drive assemblies 10 typically have a form factor of 1.8, for example, and employ a 1.8 inch hard disk 11. A head arm assembly 12 is provided with read/write heads 13 at one end, and is rotatably mounted on a pivot 14. The other end of the head arm assembly 12 is disposed within a magnetic structure assembly 15.

Figure 2:
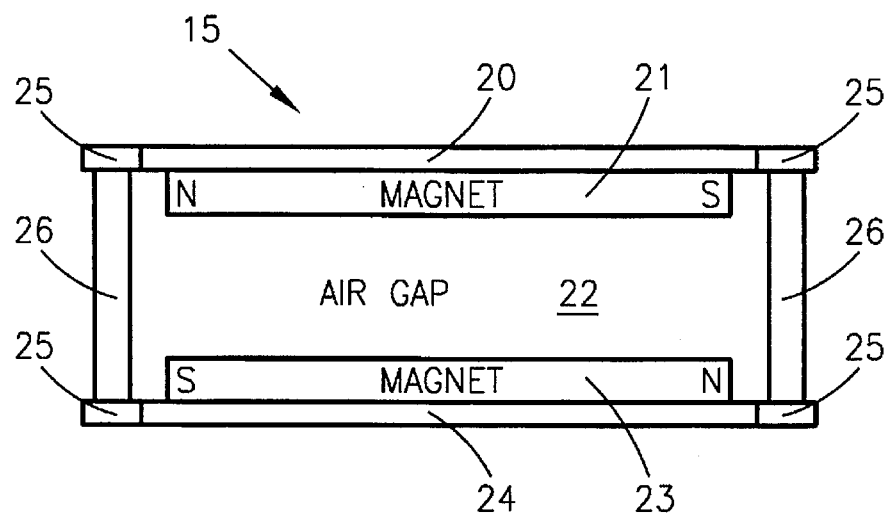
FIG. 2 is a top view of a two-magnet design of a magnetic structure assembly which may be used in the hard disk drive assembly shown in FIG. 1.
Figure 3:
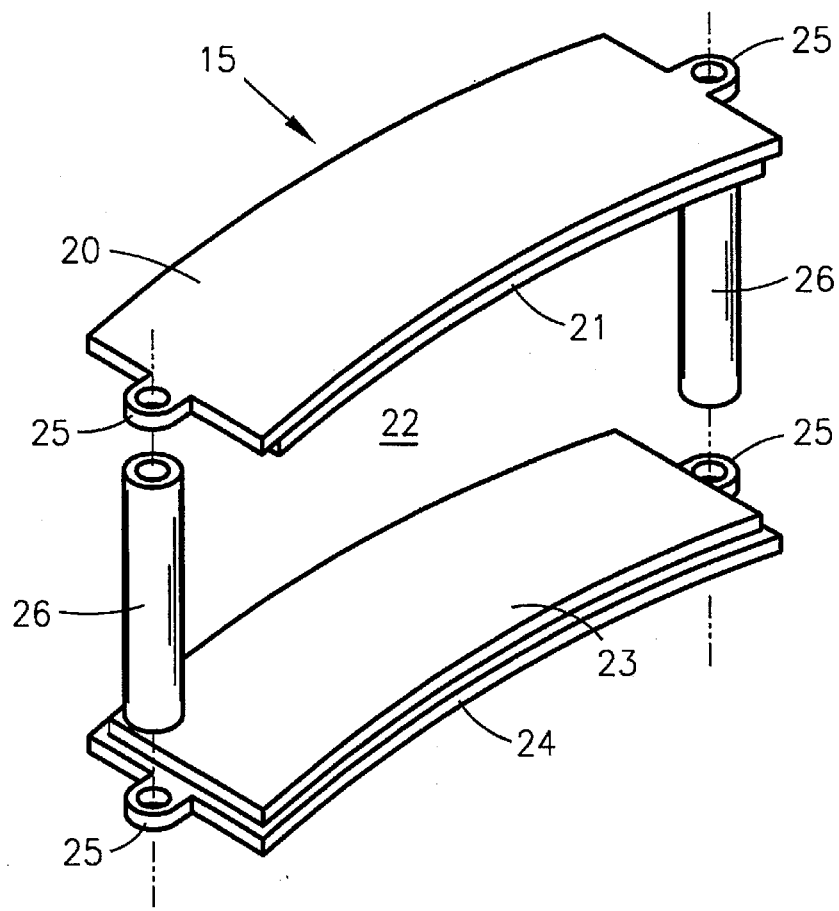
FIG. 3 is an exploded perspective view of the two-magnet design magnetic structure assembly shown in FIG. 2.

Referring now to FIGS. 2 and 3, FIG. 2 shows a top view of a two-magnet design of a magnetic structure assembly 15 that may be used in the hard disk drive assembly 10 shown in FIG. 1, while FIG. 3 shows an exploded perspective view thereof. The magnetic structure assembly 15 may employ either one or two magnets. A two-magnet design as in FIGS. 2 and 3 has the performance advantage of a sharper flux transition zone for more usable travel in a given configuration, but it is always more expensive than a one-magnet design.

As shown in FIGS. 2 and 3, the magnetic structure assembly 15 is constructed in layers. The top layer is an upper pole piece 20 to which is affixed an upper magnet 21. An air gap 22 separates the upper magnet 21 from a lower magnet 23 which is affixed to a lower pole piece 24. The magnets 21, 23 are bipolar permanent magnets, and the magnetic flux changes from one polarity, through zero flux, to the opposite polarity, resulting in a flux transition zone in the center of the air gap 22. The pole pieces 20, 24 may be made of steel, and are provided with mounting flanges 25 for connecting the magnetic structure assembly 15 together using stand-offs 26 and fasteners such as screws (not shown).

Figure 4:
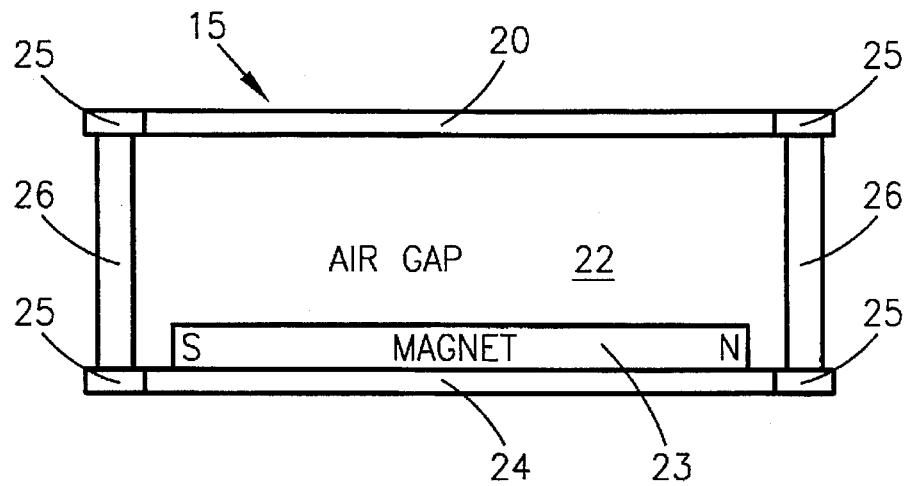
FIG. 4 is a top view of a one-magnet design of a magnetic structure assembly which may be used in the hard disk drive assembly shown in FIG. 1.

FIG. 4 shows a top view of a one-magnet design of a magnetic structure assembly 15 typical of the type that may be used in the hard disk drive assembly 10 shown in FIG. 1. This embodiment is similar to that of FIGS. 2 and 3 except that it has only the lower magnet 23. The upper pole piece 20 completes the magnetic circuit for the lower magnet 23.

Figure 5:
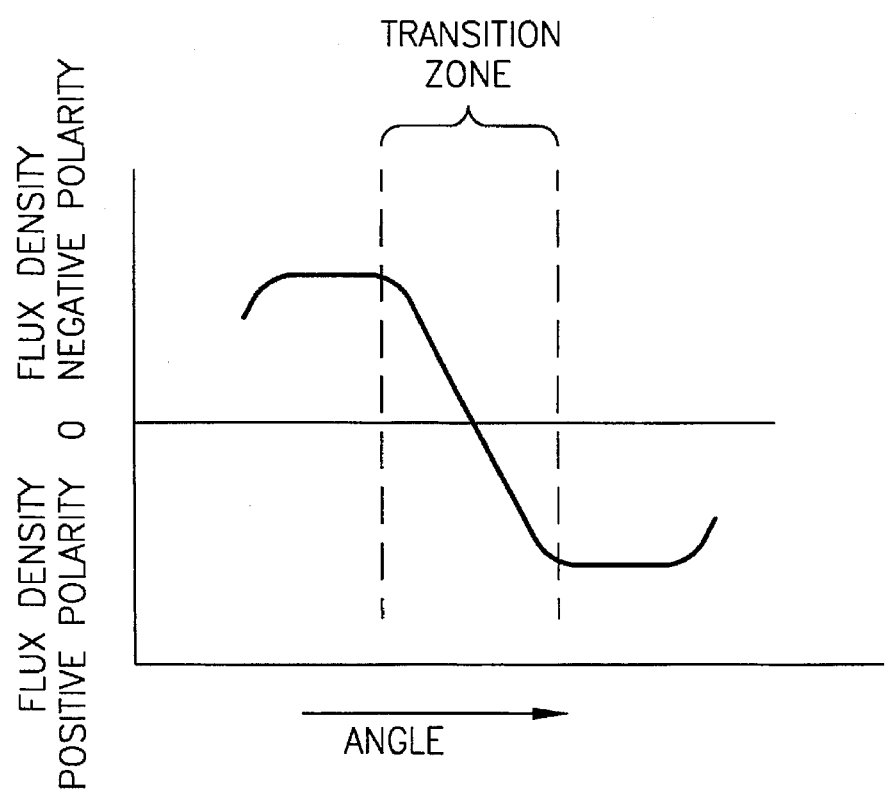
FIG. 5 is a plot of the flux density in the air gap of the magnetic structure assemblies shown in FIGS. 2–4, and showing a flux transition zone.

FIG. 5 is graph showing a plot of the flux density in the air gap 22. The abscissa is labeled "ANGLE", meaning the position from left to right in the air gap. It is an object of the present invention to shape the magnetic flux in the transition zone to achieve optimum linearity and to reduce the length of the transition zone. In addition, the flux is shaped such that it is falling on one side and rising on the other side. When the falling and rising flux is added, there is a compensation that results in a linear flux density.

Figure 6:
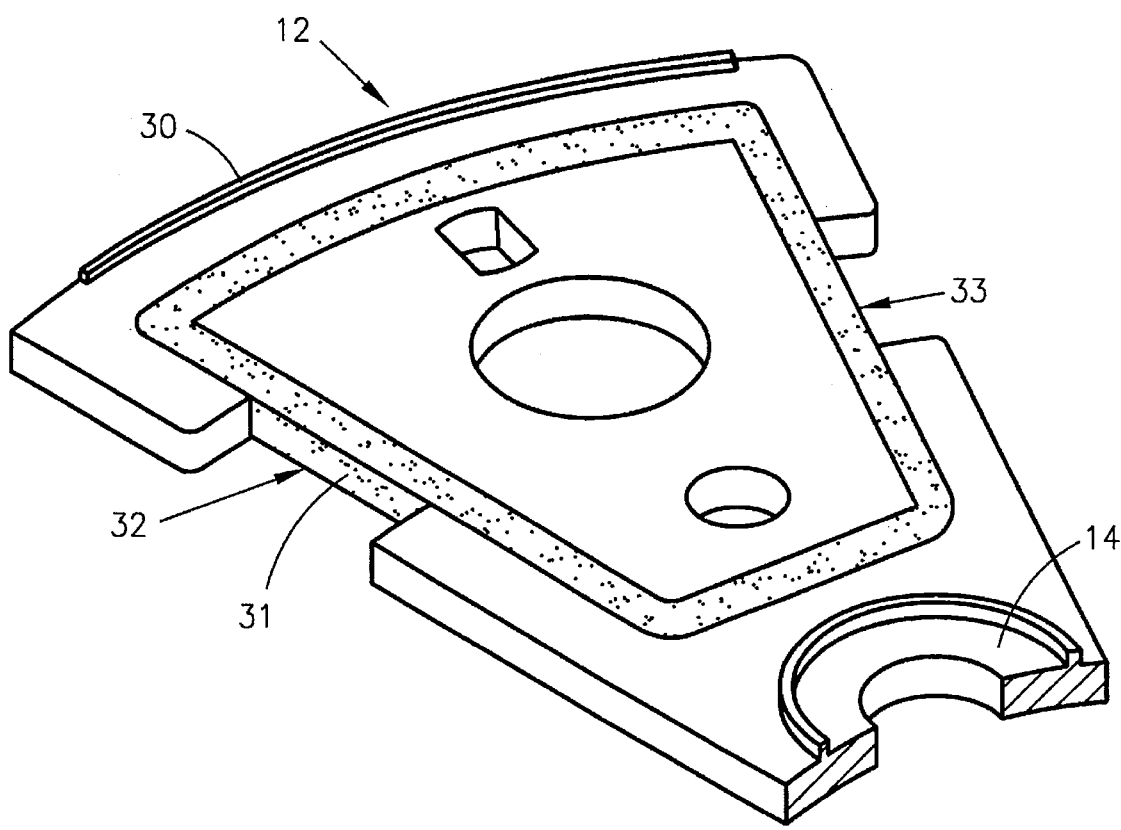
FIG. 6 is a fragmentary perspective view of a portion of a movable head arm assembly that may be employed with the magnetic structure assemblies shown in FIGS. 2–4, and showing a coil bobbin mounted thereon.

Referring now to FIG. 6, there is shown a perspective view, partially broken away, of a head arm assembly 12 that may be employed with the magnetic structure assemblies 15 of FIGS. 2–4. The head arm assembly 12 comprises an arm 30 shown broken away through the pivot 14. The arm 30 has a generally flat surface that is configured as an angular sector. A trapezoidal coil bobbin 31 is affixed to the flat surface of the arm 30 by any conventional method such as by gluing or overmolding plastic. The coil bobbin 31 comprises a number of turns of a wire coil having a left side 32 and a right side 33. That is to say, there is one coil bobbin 31 having a single multiturn coil of wire going upward on one side (for example the left side 32) and downward on the other side (the right side 33).

The head arm assembly 12 is rotatably mounted by the pivot 14 with the bobbin 31 disposed in the air gap 22 (as shown in FIGS. 2, 4) of the magnetic structure assembly 15 (as shown in FIGS. 2, 4). The multiturn coil of wire wound on the coil bobbin 31 includes electrical connections which enable the coil to carry a current thereby generating a magnetic field which interacts with the magnetic field of the permanent magnets 21, 23 mounted on the pole pieces 20, 24.

When current passes through the turns of the coil on the bobbin 31, the left side 32 is in a magnetic field extending from north to south, while the right side 33 is in a magnetic field extending from south to north. The current in the left side 32 of the coil travels in one direction, while the current in right side 33 of the coil travels in the opposite direction. Consequently, two additive torques are produced that result in a stroke of the head arm assembly 12. The stroke constant is measured in ounce-inches/ampere, and is represented by the symbol Kt.

Figure 7:
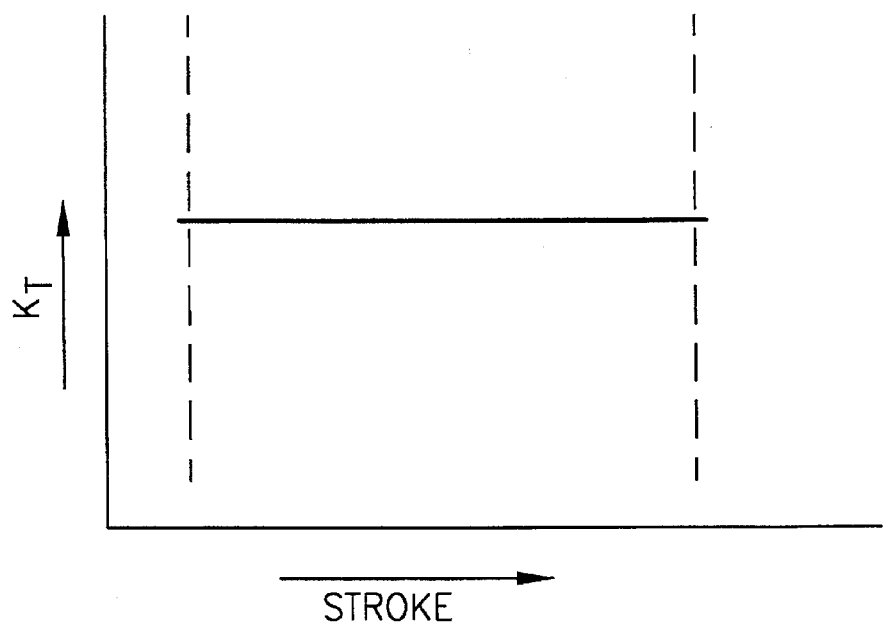
FIG. 7 is a graph of the useful stroke of a voice coil motor (VCM) plotted as a function of the force constant or Kt, illustrating the ideal VCM stroke as having the highest possible Kt and being linear over the useful stroke.

FIG. 7 is a graph of the useful stroke of a voice coil motor (VCM) plotted as a function of the force constant or Kt. This figure shows the ideal situation where the Kt or force constant is the highest possible, and remains linear over the useful stroke of the VCM.

Figure 8:
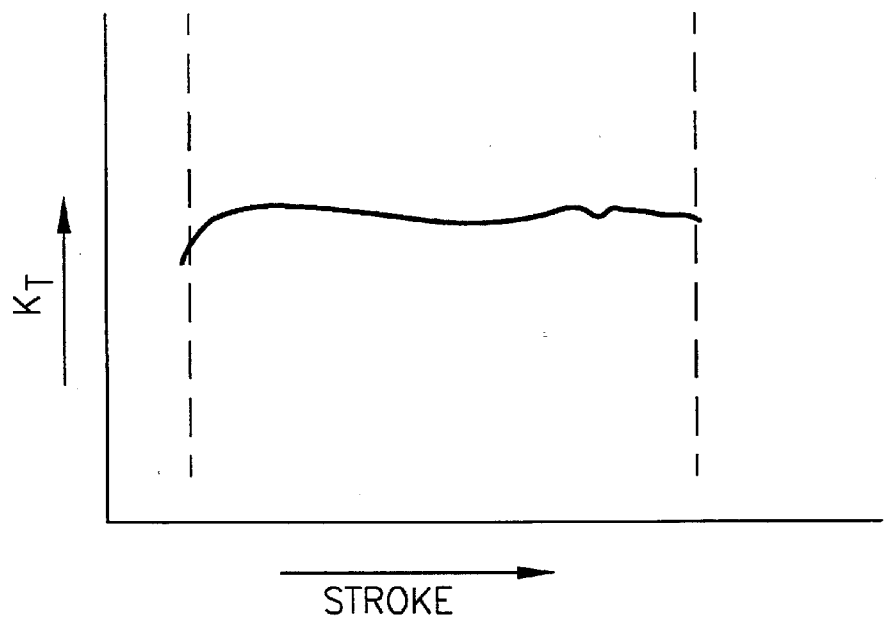
FIG. 8 is also a graph of the useful stroke of a voice coil motor (VCM) plotted as a function of the force constant or Kt, but showing the characteristics of a VCM stroke produced heretofore by a typical present day actuator.

FIG. 8 is also a graph of the useful stroke of a voice coil motor (VCM) plotted as a function of the force constant or Kt, but showing the characteristics of a VCM stroke produced heretofore by a typical present day actuator. As shown in the figure, prior to the advent of the present invention, the Kt or force constant has been a lower value than the ideal, and the force constant is not linear over the useful stroke. That is, the force constant has a drop-off.

Figure 9:
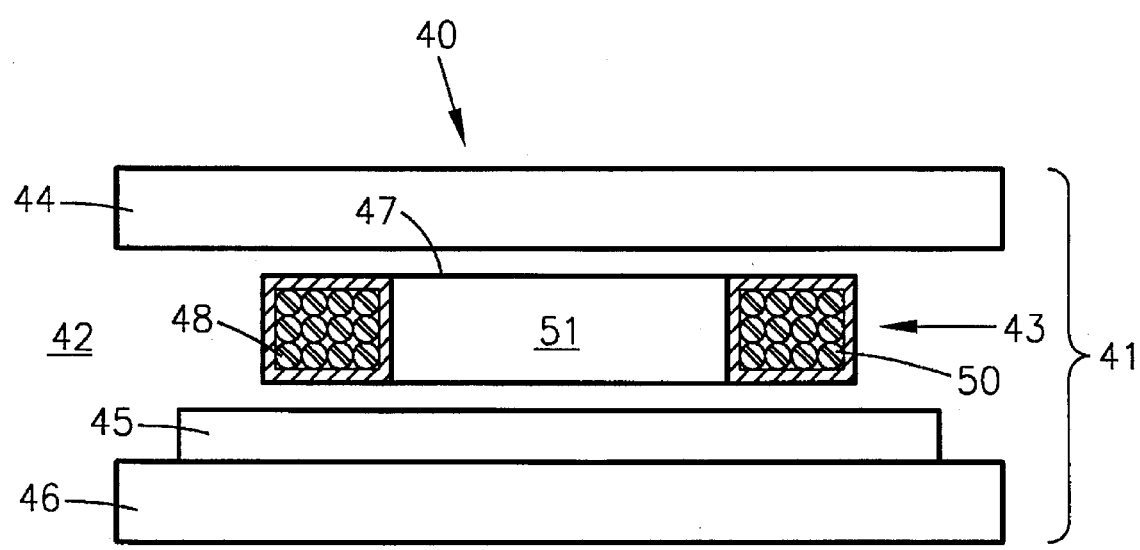
FIG. 9 is a top view, partially in cross-section, of a VCM having a coil bobbin on a movable head arm assembly disposed in the air gap of a one-magnet design of a magnetic structure assembly.
Figure 10:
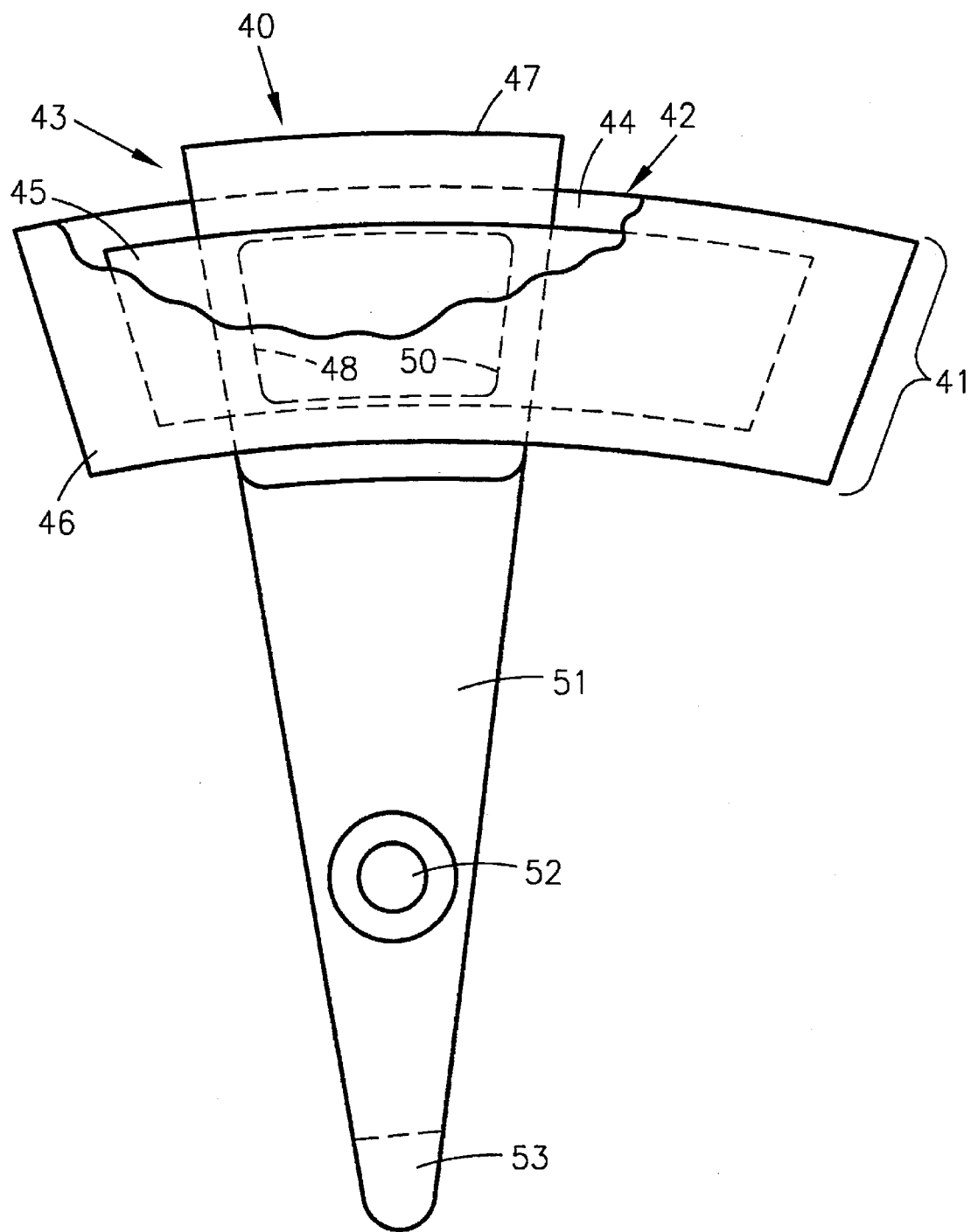
FIG. 10 is a plan view, partially broken away, of the VCM shown in FIG. 9.

Referring now to FIG. 9, taken in conjunction with FIG. 10, there is shown a VCM 40 comprising a magnetic structure assembly 41 having an air gap 42, with a moving coil 43 disposed therein. FIG. 9 is a view looking into the air gap 42, while FIG. 10 is a view taken at right angles thereto. The magnetic structure assembly 41 comprises an upper pole piece 44 and a lower magnet 45 attached to a lower pole piece 46. The moving coil 43 comprises a bobbin 47 including a left coil leg 48 and a right coil leg 50 all attached to an actuator arm 51. Referring now more specifically to FIG. 10, the actuator arm 51 comprises a pivot 52 and a read/write head 53.

Figure 11:
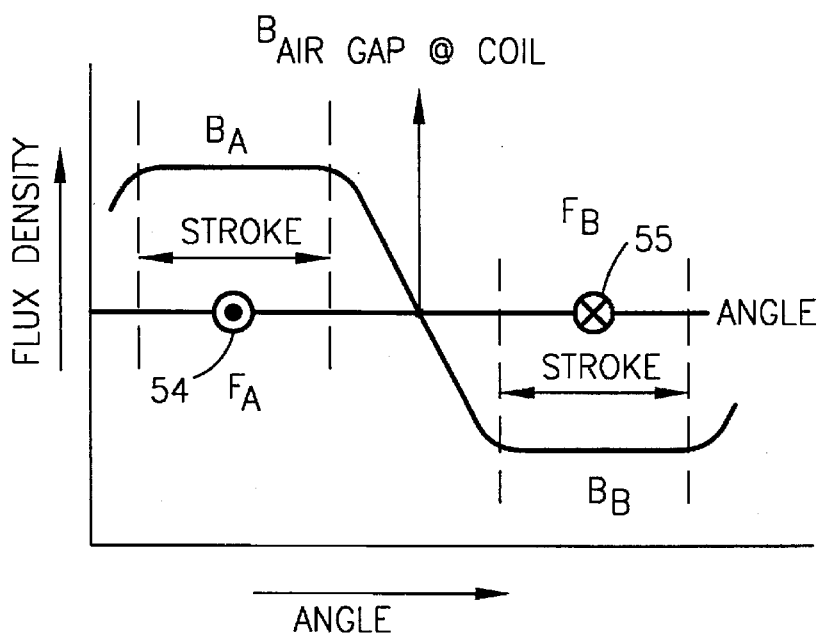
FIG. 11 is a graph of flux density plotted as a function of angle in the air gap of the VCM shown in FIGS. 9 and 10.

Referring now to FIG. 11, there is shown a graph of flux density plotted as a function of angle in the air gap of the magnetic structure assembly 41 shown in FIGS. 9 and 10. The left circle 54 represents current coming out of the paper in the left coil leg 48 of FIGS. 9 and 10. Similarly, the right circle 55 represents current going into the paper in the right coil leg 50 (FIGS. 9 and 10). The useful stroke of the VCM 40 (FIGS. 9 and 10) is indicated as the distance between the vertical dashed lines. The flux density in the left side of the air gap is plotted and labelled $B_A$. Similarly, the flux density in the right side of the air gap is plotted and labelled $B_B$. The flux density in the transition zone where the flux density plot crosses the horizontal axis is labelled $B_{AIR\ GAP}$ @ Coil. The force generated on the left is designated $F_A$, while the force generated on the right is designated $F_B$.

One problem with small scale VCM actuators is that less height and width is available which makes it difficult to attain the optimum VCM constant, Km, per unit volume. Optimum VCM performance requires the highest Kt, or force constant over the useful stroke of the VCM. Linearity is important to ensure that the VCM consistently produces the same response, i.e. the same bang-bang access time and the same settling time, no matter where the actuator is on the disk.

Referring again to FIG. 9, there is one coil bobbin 47 having a single multiturn coil of wire going upward on one side as the left coil leg 48, and going downward on the other side as the right coil leg 50. The plus and minus signs of the magnetic field change on the two sides so that the current in the left coil leg 48 creates a force that adds to the force created by the current in the right coil leg 50. The torque is proportional to the radius times the current, times the number of turns, times the quantity (the flux on the left side+flux on the right side). That is, Torque=$RIN_{AB}(B_A+B_B)$, where R=radius, I=current, N=number of turns, and B=flux density.

For linearity over the stroke, it is desirable to have $N_A B_A$ and $N_B B_B$ be linear and constant. For highest "Kt", it is desirable to have $B_A N_A + B_B N_B$ to be a maximum for a given shape. Highest Kt for a given first moment balance occurs with the smallest coil angle. However, linearity for the same coil angle becomes worse. The challenge is the limitation in the height dimension. The height is limited because of the use being in a laptop style of computer. There is also a limit to the coil mass. A large number of turns cannot be added to the coil because that creates a high mass, which affects the balance (the first moment). Another limitation is that the coil angle must be kept to a minimum.

Figure 12:
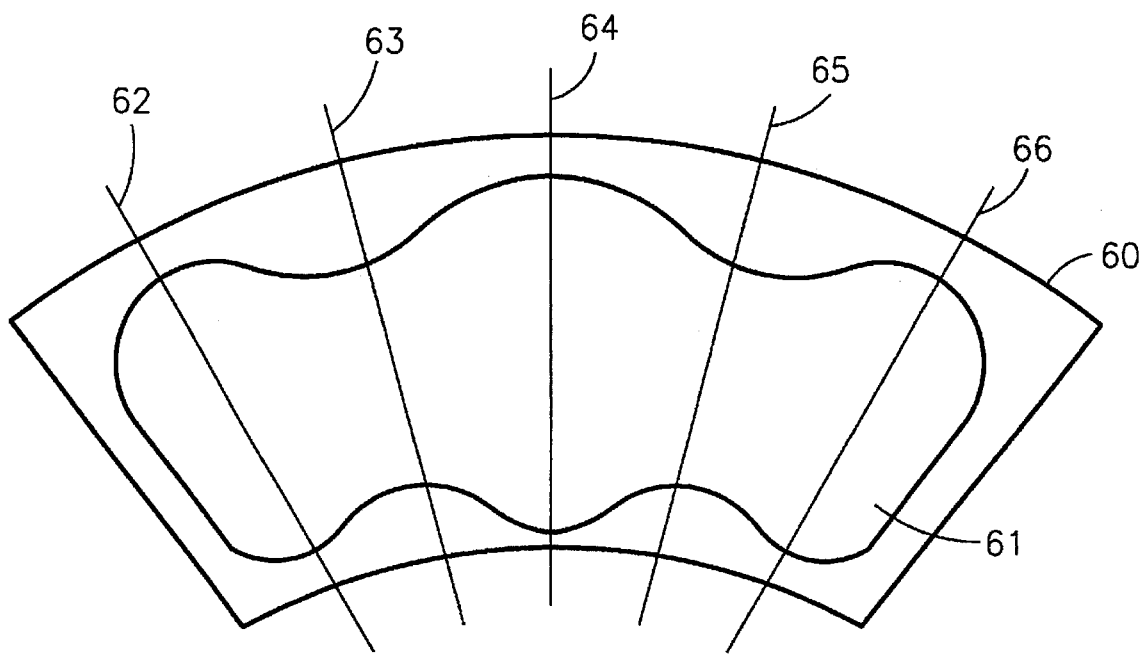
FIG. 12 is a plan view of a VCM magnet that has been profiled or contoured in accordance with the invention in order to shape the flux pattern thereof.

Referring now to FIG. 12, there is shown a plan view of a preferred embodiment of a pole piece 60 in accordance with the invention, having a permanent magnet 61 attached thereto. In accordance with the principles of the present invention, the magnet 61 is profiled or contoured for the purpose of shaping the flux in the air gap in the transition zone to achieve improved linearity. This shaping of the flux reduces the width of the transition zone. In addition, the flux is shaped such that it is falling on one side and rising on the other side. When the falling and rising flux is added, there is a compensation that results in a linear flux density.

In the preferred embodiment of FIG. 12, the shaping or profiling has been performed all around the outer periphery of the magnet 61. The radial lines 62–66 in FIG. 12 represent different angular positions that the coil bobbin might occupy during operation of the VCM. Radial line 64 represents the zero flux transition line of the magnetic circuit at the middle of the magnet 61. As may be seen in the figure, the path across the magnet 61 is different at each radial position. Along radial line 62 there is more magnet surface, along line 63 there is less, along line 64 there is more, along line 65 there is less, and along line 66 there is more magnet surface. The flux density in the air gap produced by the magnetic structure is also shaped or contoured because the magnet 61 is profiled.

Although FIG. 12 shows the profiling as having been performed all around the entire outer periphery of the magnet 61, it should be understood that the profiling may be performed only along the top edge of the magnet 61, or only along the bottom edge, if desired. Similarly, the profiling may be performed only along the outer edges, if desired. Also, the shaping may be performed on either the pole piece 61, or the magnet 60. The profiling or flux shaping may also be applied to a two-magnet design, as well as to a one-magnet design. Alternatively, the shaping may be done radially in the transverse plane, that is by shaping the profile in thickness. More specifically, the thickness of the magnet 61 at the lower edge is different from the thickness at the upper edge. As one travels along one of the radial lines 62–66 in FIG. 12, the thickness of the magnet 61 has been varied to shape the profile. Furthermore, the thickness of the pole piece 60 may be correspondingly profiled to match the profile of the magnet 61. The shaping may be done so that when the flux is falling in one gap it is rising in the other gap. In this manner, the sum of the flux in the two gaps remains the same.

Referring now to FIGS. 13, 14 and 15, there is shown another embodiment of a profiled VCM magnet 70 in accordance with the invention. The magnet 70 may be made of nickel-plated Neodymium-Iron-Boron alloy material approximately 0.127 inch thick and approximately 1.624 inches high as seen in the side view shown in FIG. 14. The magnet 70 may have a generally fan-shaped configuration, and may subtend an angle of 76 degrees as shown in the plan view of FIG. 13. As shown in FIGS. 13 and 15, the lower edge 71 of the magnet 70 is uniformly curved, and is not contoured. The upper surface is contoured to have a full lobe 72 at each end, and two partial lobes 73 in between.

Figure 16:
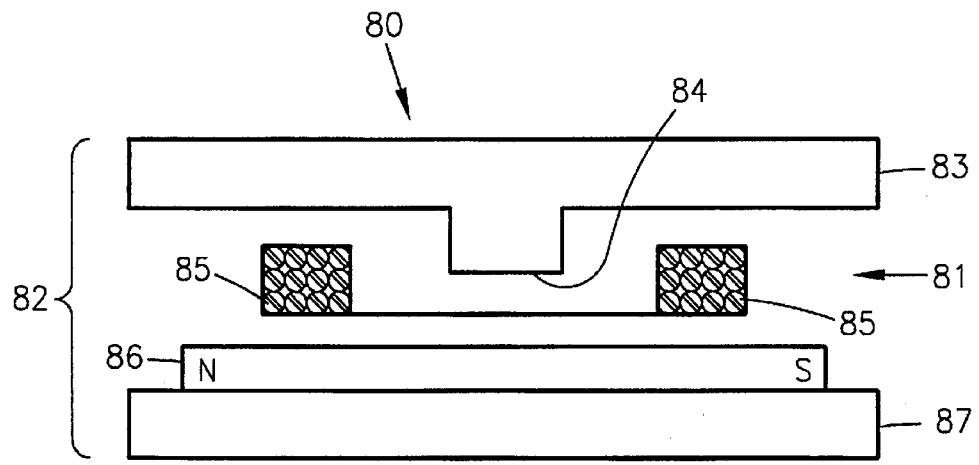
FIG. 16 is a top view, partially in cross-section, of a VCM having a contoured pole piece in accordance with the invention for the purpose of shaping the flux pattern in the air gap.
Figure 17:
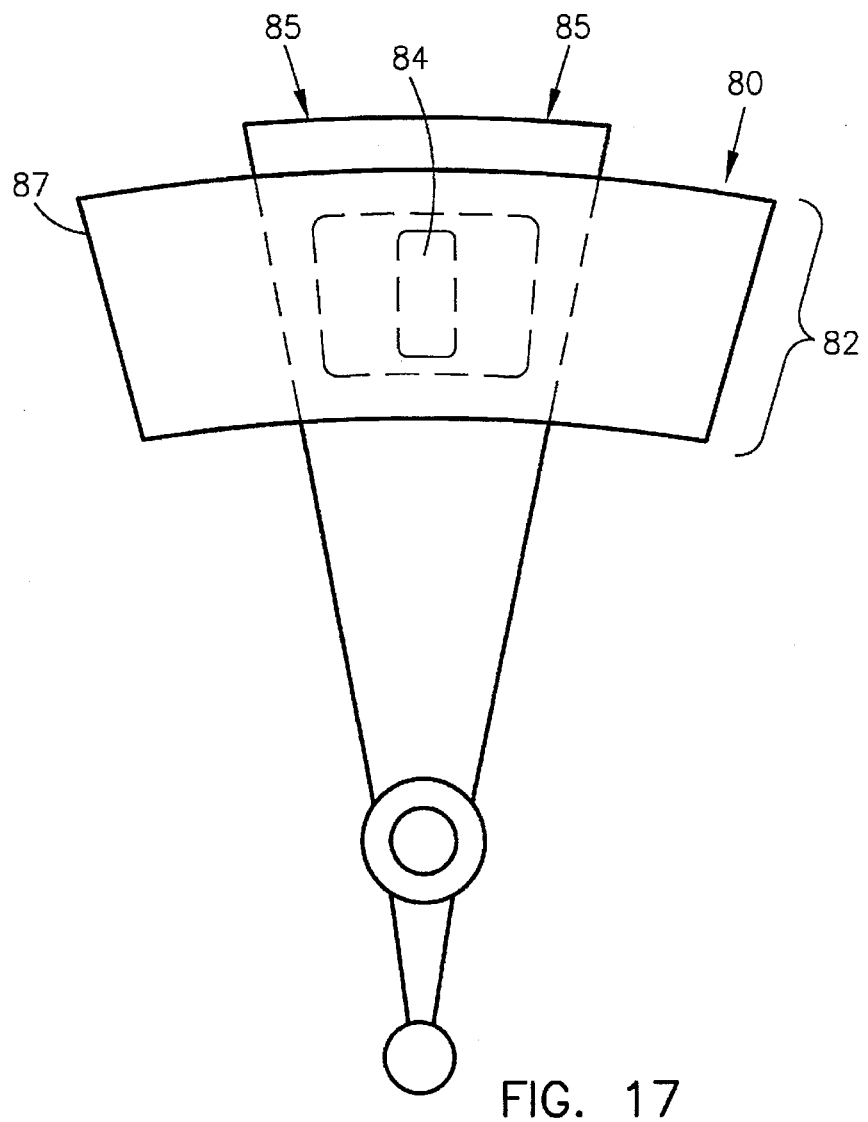
FIG. 17 is a plan view of the VCM shown in FIG. 16, illustrating the relationship of the contoured pole piece to the coil bobbin.

Referring now to FIG. 16, taken in conjunction with FIG. 17, there is shown an alternative embodiment of a VCM 80 constructed in accordance with the principles of the present invention. FIG. 16 is a top view of the VCM 80 looking into the air gap 81 of the magnetic structure assembly 82, while FIG. 17 is a plan view of the VCM 80 shown in FIG. 16. As shown in FIG. 16, an upper pole piece 83 is provided with a generally rectangular protrusion 84 that extends between coil sides 85 in the air gap 81. A magnet 86 having north and south poles is disposed in the air gap 81 on the other side of the coil sides 85. The magnet 86 is affixed to a bottom pole piece 87.

The protrusion 84 in the air gap 81 reduces the reluctance of the magnetic circuit and also narrows the flux transition zone where it changes from one polarity through zero to the other polarity. The protrusion 84 also provides a crash stop in a location that would otherwise be unused. Shock requirements are increasing and mishaps require some form of crash stop. Sometimes there is no room for a conventional latch to stop the actuator. The basic configuration of the VCM 80 includes a moving coil having coil sides 85. The protrusion 84 provides an integral crash stop internally that allows space for the stroke. The protrusion 84 protrudes but does not interfere with the tolerances of the bobbin and yet is able to act as a crash stop. The protrusion 84 is shaped to be parallel to the coil sides 85 and of a width to allow the stroke without contact, and yet to make contact when required for the purpose of limiting the travel of the coil sides 85.

Alternatively, the magnet 86 may be configured to have the protrusion 84 instead of the upper pole piece 83. Forming the protrusion 84 on the magnet 86 results in the most improvement in the transition zone but it makes the VCM 80 more costly to manufacture. The protrusion 84 may be made to a lesser depth so that it does not make contact with the coil sides 85. This provides improvement in the transition zone without providing a crash stop.

Figure 18:
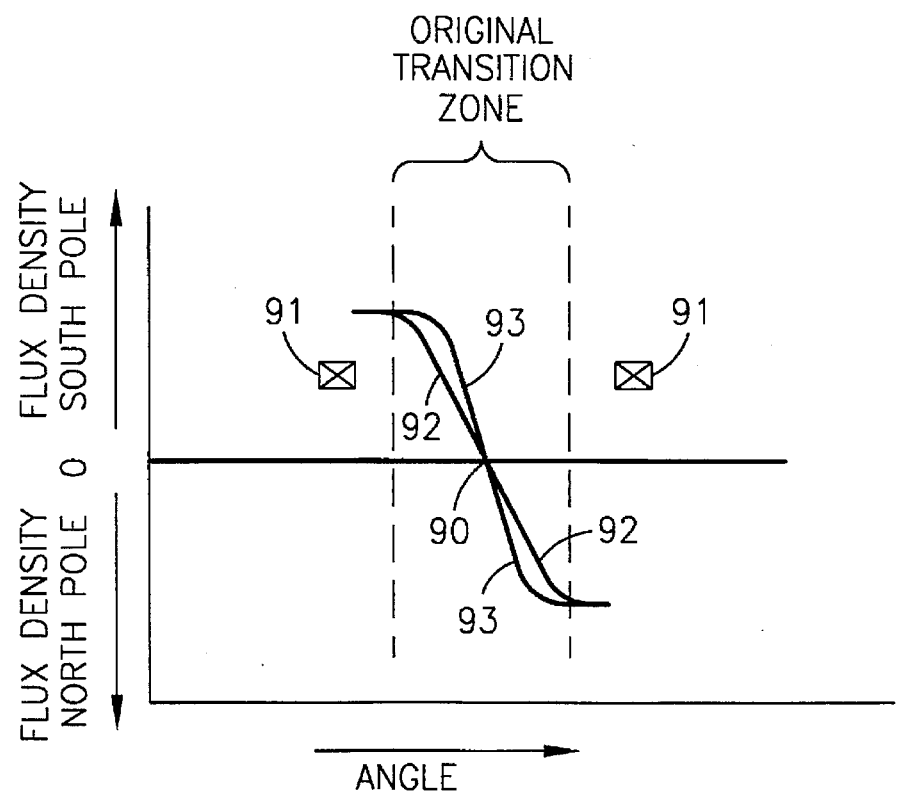
FIG. 18 is a graph of flux density plotted as a function of angle in the air gap showing the improvement in the transition zone produced by the VCM shown in FIGS. 16 and 17.

FIG. 18 is a graph of flux density in the air gap plotted as a function of angle, and shows the improvement in the transition zone due to the protrusion 84 of FIGS. 16 and 17. In FIG. 18, the flux passes through zero at the point marked 90. The original transition zone is the region between the two vertical dashed lines. The rectangles 91 having an X therein represent the coil windings. The curve marked 92 represents the "before" condition, and the curve marked 93 represents the improvement produced by the protrusion in the air gap.

The result of employing a protrusion 84 (FIG. 16) in accordance with the principles of the present invention is to improve the flux pattern in the air gap as shown by FIG. 18. The improvement occurs because the steel (a magnet 86 shown in FIG. 16) changes the basic reluctance, permeance, and magnetomotive force (mmf) relationships. In the case of the "steel" pole piece 83 (shown in FIG. 16), the reluctance is lowered in the center area thereby increasing the radial (and axial) coefficient of flux in the air gap. In the case of the magnet 86 (shown in FIG. 16), the mmf in the transition zone is improved resulting in more flux. Each of the foregoing measures reduces the width of the transition zone. The consequence is that the coil can travel farther before reaching the decline of flux density.

To compensate for the flux fall-off at either the transition zone or at the edge of the magnet, some "shaping" of the reluctance/mmf may be used. As described hereinabove, the stroke may be made large by the use of a protrusion at the transition zone. The stroke may also be extended at the edge of the magnet.

Figure 19:
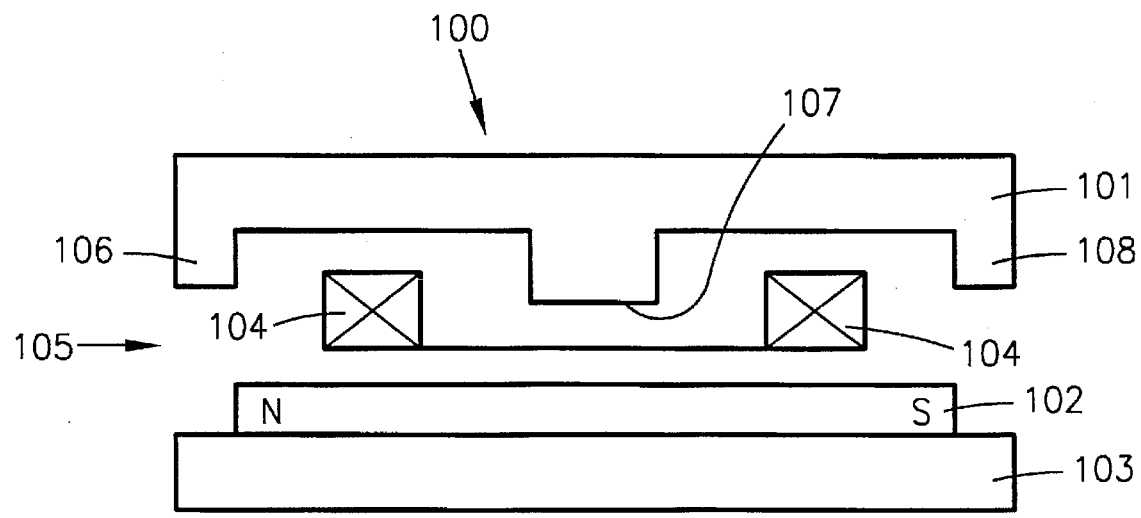
FIG. 19 is a top view of another embodiment of a VCM showing an alternative contouring of a pole piece.

Referring now to FIG. 19, there is shown another embodiment of a VCM 100 having an upper pole piece 101, a magnet 102 and a lower pole piece 103. Coil sides 104 are disposed in an air gap 105 between the upper pole piece 101 and the magnet 102. In accordance with the present invention, the pole protrusions 106, 107, 108 are provided to compensate for flux fall-off at the edge of the magnet 102. Pole protrusions 106 and 108 are disposed at the outer edges of the upper pole piece 101, while pole protrusion 107 is located in the central transition zone. The pole protrusions 106, 107, 108 (which may also act as crash stops) are provided to shape the flux to extend it to the outside of the upper pole piece 101, thereby making a larger flux zone having a constant flux density over the stroke of the VCM 100.

Figure 20:
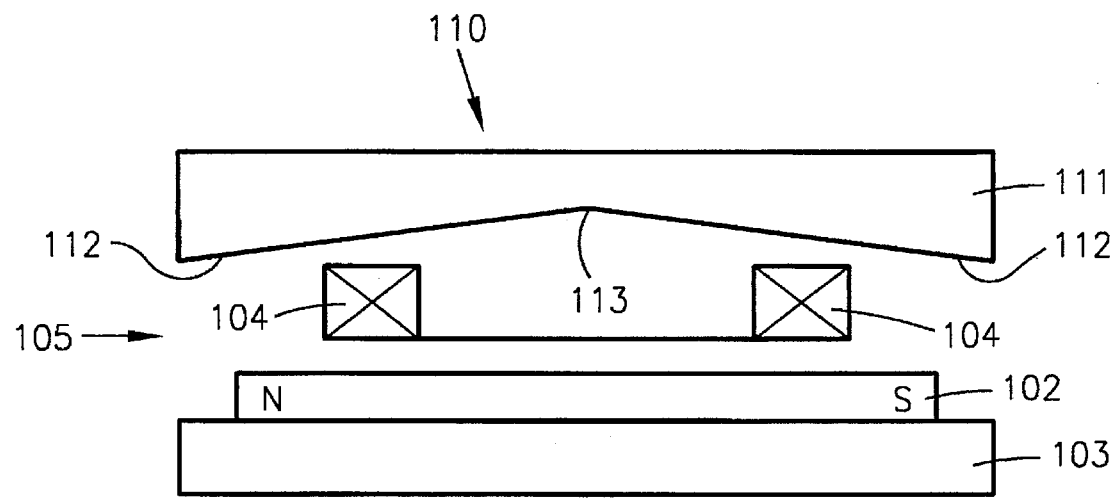
FIG. 20 is a top view of yet another embodiment of a VCM constructed in accordance with the principles of the present invention.

Referring now to FIG. 20, there is shown an embodiment of a VCM 110 having an upper pole piece 111, a magnet 102, and a lower pole piece 103. Coil sides 104 are disposed in an air gap 105 between the upper pole piece 111 and the magnet 102. In accordance with the present invention, the upper pole piece 111 has no central protrusion. Instead, the outer edges 112 of the upper pole piece 111 extend outward toward the magnet 102, and then angularly slope inward to an apex 113 in the center of the transition zone.

Figure 21:
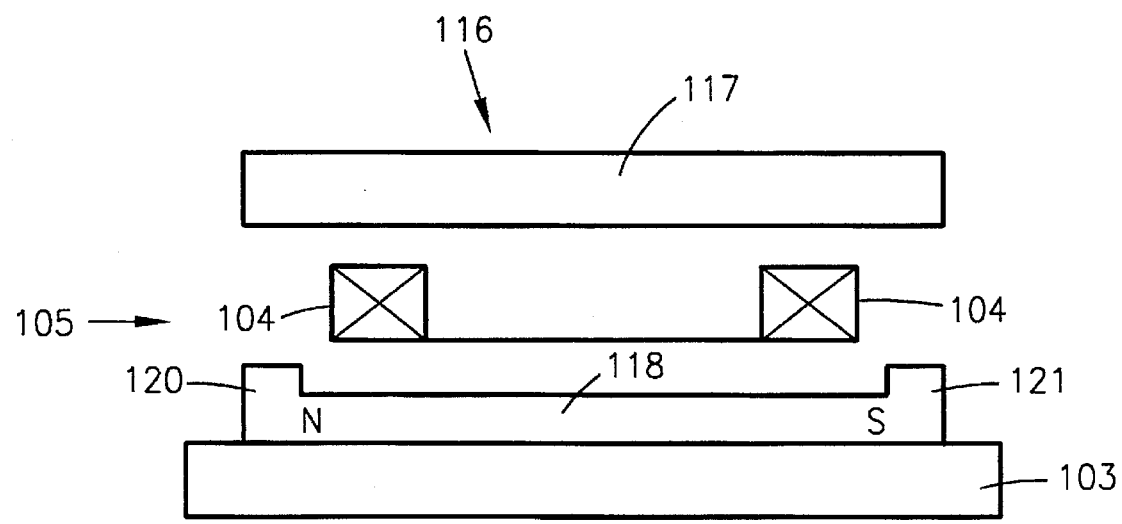
FIG. 21 is a top view of another embodiment of a VCM showing contouring of a lower magnet.

Referring now to FIG. 21, there is shown an embodiment of a VCM 116 having an upper pole piece 117, a magnet 118, and a lower pole piece 103. Coil sides 104 are disposed in an air gap 105 between the upper pole piece 117 and the magnet 118. In accordance with the present invention, the magnet 118 may be extended. As shown in FIG. 21, the magnet 118 has an extension 120 at the north pole, and an extension 121 at the south pole. These extensions 120, 121 extend into the air gap 105 toward the upper pole piece 117. The magnet extensions 120, 121 (which may also act as crash stops) are provided to shape the flux to extend it to the outside of the upper pole piece 117, thereby making a larger flux zone having a constant flux density over the stroke of the VCM 116.

Figure 22:
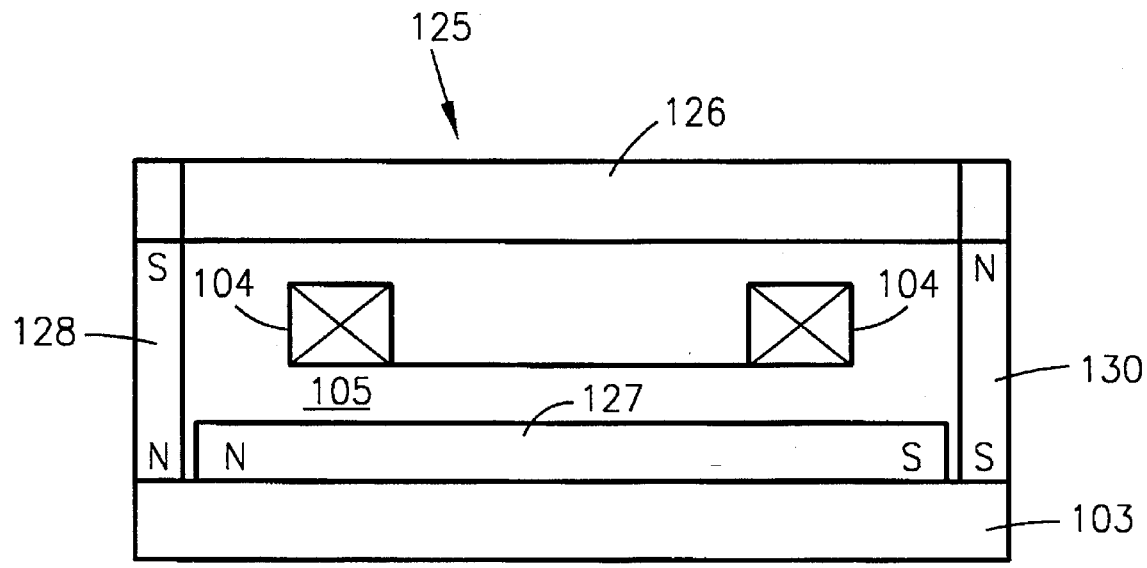
FIG. 22 is a top view of yet another embodiment of a VCM constructed in accordance with the principles of the present invention showing the use of separate small magnets in conjunction with the principal magnet.

Referring now to FIG. 22, there is shown an embodiment of a VCM 125 having an upper pole piece 126, a magnet 127, and a lower pole piece 103. Coil sides 104 are disposed in an air gap 105 between the upper pole piece 126 and the magnet 127. In accordance with the present invention, separate magnets 128, 130 may be inserted as stand-offs, or are otherwise added to the principal magnet 127. The added separate magnets 128, 130 may be very inexpensive, on the order often cents, for example, compared to the one dollar plus range for the principal magnet 127. Again, the location of the added separate magnets 128, 130 may be selected so that they may be used as crash stops, if desired.

Figure 23:
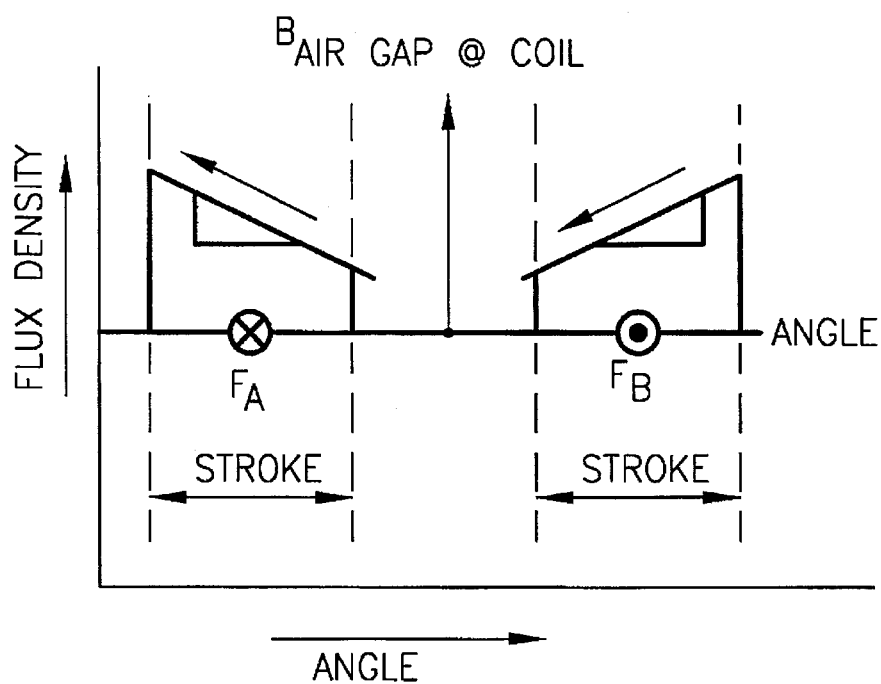
FIG. 23 is a graph of flux density plotted as a function of angle in the air gap of the VCM of the present invention, illustrating profiling of both magnetic poles to provide compensation.

Referring now to FIG. 23, there is shown a graph of flux density plotted as a function of angle in the air gap of the VCM of the present invention. The present invention is not solely directed toward reducing the transition zone in order to achieve good linearity of the VCM. In accordance with the principles of the present invention, compensation of the A/B flux is provided so that when one is falling, the other is rising. This is illustrated in FIG. 23. The flux in A at the left of FIG. 23 slopes downward to the right. The flux in B at the right of FIG. 23 slopes upward to the right. The slope in each case is approximately the same. Since the force produced by both poles add to produce the force constant of the actuator arm, the two slopes combine to produce compensation. The shaping can be done so that when the flux is falling in one gap it is rising in the other gap. In this manner, the sum remains the same. Thus, profiling of "both poles" can be employed to achieve linearity.

Figure 24:
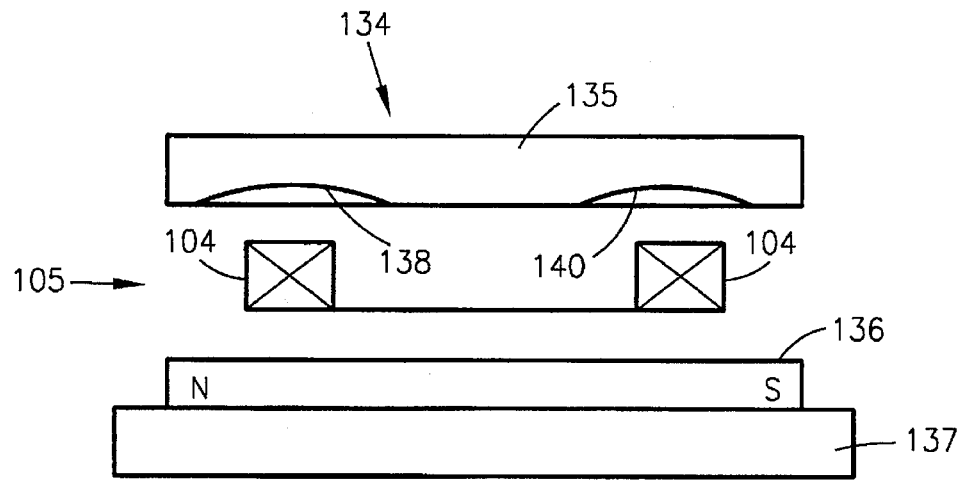
FIG. 24 is a top view of another embodiment of a VCM constructed in accordance with the principles of the present invention showing the use of air gaps or grooves to increase the reluctance.

Referring now to FIG. 24, there is shown an embodiment of a VCM 134 having an upper pole piece 135, a magnet 136, and a lower pole piece 137. Coil sides 104 are disposed in an air gap 105 between the upper pole piece 135 and the magnet 136. In accordance with the present invention, the upper pole piece 135 is provided with grooves 138, 140. The addition of the grooves 138, 140 to the upper pole piece 135 provides the desired pole shaping. The grooves 138, 140 make the reluctance path longer by adding an extra air gap. This provides the upper pole piece 135 with a built-in profile.

Figure 25:
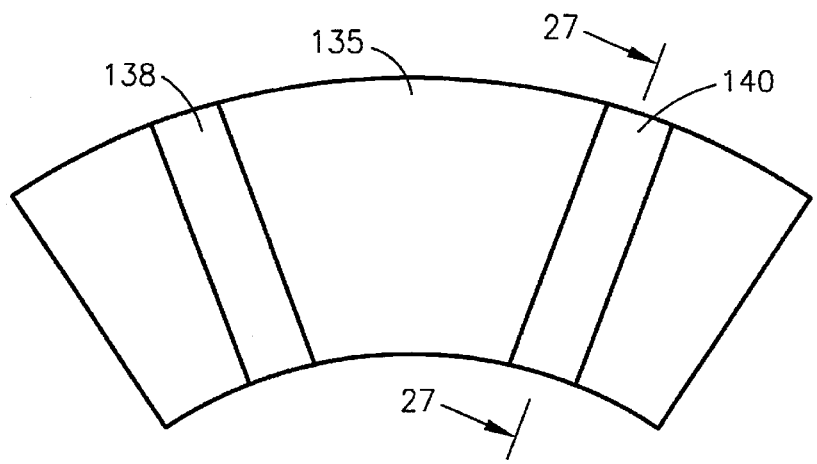
FIG. 25 is a plan view of an upper pole piece of FIG. 24, showing grooves with straight sides.

Referring now to FIG. 25, there is shown a plan view of the upper pole piece 135 of the VCM shown in FIG. 24. This figure shows that the grooves 138, 140 have parallel sides, e.g., such as at an angle 27. Such grooves 138, 140 are the easiest to make.

Figure 26:
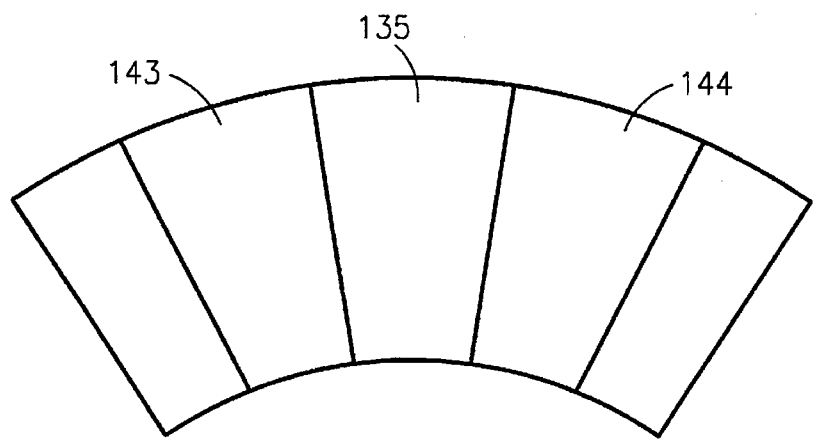
FIG. 26 is a plan view similar to FIG. 25 except that the grooves are angular to match the coil sides as shown in FIG. 6.

FIG. 26 is a plan view similar to that of FIG. 25, except that the upper pole piece 135 has grooves 143, 144 that do not have parallel sides. The grooves 143, 144 shown in FIG. 26 have angular sides to match the coil sides. Referring back to FIG. 6, typically the arm 30 comprises a flat surface that is configured as an angular sector and has a trapezoidal coil bobbin 31 affixed thereto. The grooves 143, 144 of FIG. 26 are configured to match the coil sides as shown in FIG. 6.

Figure 27:
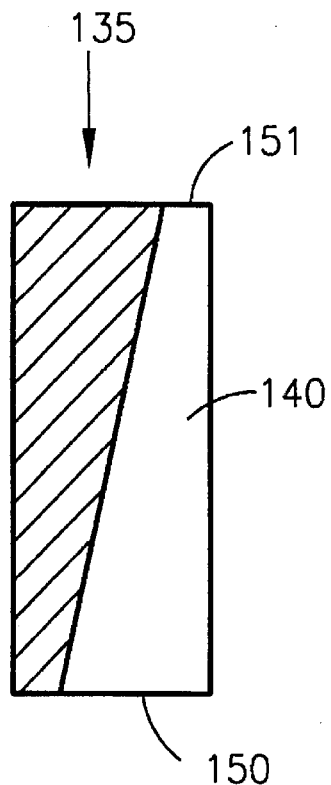
FIG. 27 is a cross-sectional side view of the upper pole piece of FIG. 25, with the cross-section being taken through one of the grooves.

FIG. 27 is a cross-sectional view of the upper pole piece 135 of FIG. 25, having grooves 138, 140 with parallel sides. The cross-section of FIG. 27 is taken through one of the grooves 140. In accordance with the present invention, the grooves 140 may be radially profiled. Referring to FIG. 27, the groove 140 has a greater depth at the lower edge 150 than it does at the upper edge 151. This radial profiling of the grooves 140 in the upper pole piece 135 may also be used to tailor the flux profile.

Figure 28:
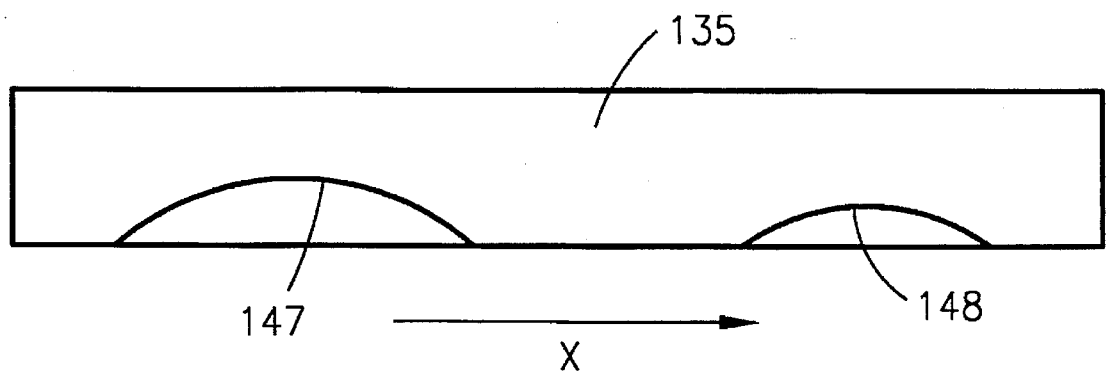
FIG. 28 is a top view of an upper pole piece showing grooves that have a variable depth and width in the radial and in the "X direction".

FIG. 28 is an end view of the upper pole piece 135, but having grooves 147, 148 that are made to be variable in depth, and variable in width, which is to say, variable in the radial direction, and variable in the "X direction", as shown in FIG. 28. This provides the capability to more precisely and accurately profile the magnetic flux.

An alternative method of providing a built-in profile to the magnetic structure assembly of a VCM is to profile the magnetizer so that when the magnetizer magnetizes the magnet, it provides the magnet with a built-in profile, as desired.

Figure 29:
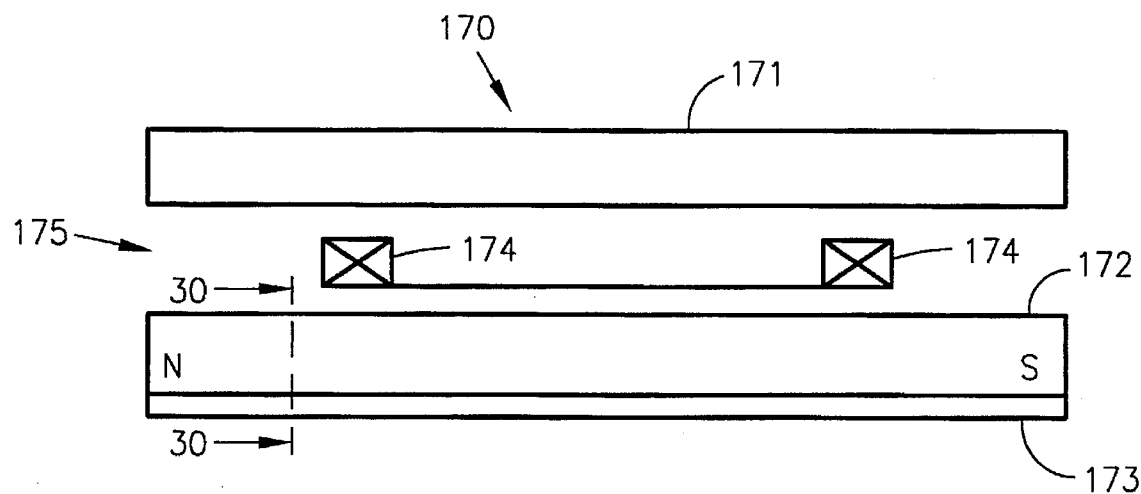
FIG. 29 is a top view of another embodiment of a VCM constructed in accordance with the principles of the present invention showing the use of radial profiling.

Referring now to FIG. 29 there is shown an embodiment of a VCM 170 having an upper pole piece 171, a magnet 172, and a lower pole piece 173. Coil sides 174 are disposed in an air gap 175 between the upper pole piece 171 and the magnet 172. In accordance with the present invention, radial profiling of the magnet 172 is provided.

Figure 30:
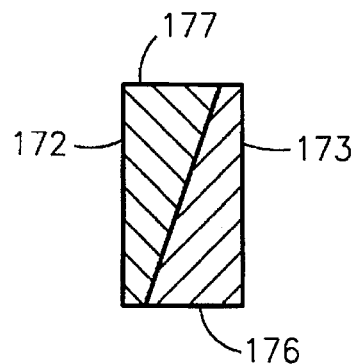
FIG. 30 is a cross-sectional view taken along the line 30—30 in FIG. 29.

FIG. 30 is a cross-sectional view of the magnet 172 and lower pole piece 173 taken along the line 30—30 in FIG. 29. The ratio of the thickness of the magnet 172 to the thickness of the pole piece 173 varies from the lower or inside dimension 176 to the upper or outside dimension 177. The magnet 172 is thicker at the top or outside dimension 177.

The result of this radial profiling is that a greater torque is provided. The torque is equal to the force times the radius.

Since the magnet 172 is thicker at the outside dimension 177, more magnet flux is provided at the longest radius. The magnetic flux returns from the north pole to the south pole by way of the shortest path.

What has been described is merely illustrative of the application of the principles of the present invention. Other arrangements and methods can be implemented by those skilled in the art without departing from the spirit and scope of the appended claims.

What is claimed is:

1. A voice coil motor for a disk drive, comprising:

an actuator arm supporting a read/write head at one end thereof, and rotatably supported for rotation about an axis;

a first pole piece arranged in a first plane perpendicular to said rotational axis;

a second pole piece arranged in a second plane in paralleley spaced relation parallel with said first pole piece and perpendicular to said rotational axis;

a permanent magnet mounted on one surface of said first pole piece to produce a magnetic field between said second pole piece and itself, said magnetic field having a magnetic flux path which includes an air gap wherein adjoining areas of oppositely directed magnetic flux define a magnetic flux transition zone, the outer periphery of said magnet being profiled in an irregular contour to shape the flux in the air gap in the transition zone, said irregular contour defining one or more lobes in the outer periphery of said magnet; and a moving coil supported by said actuator arm at the other end thereof and having coil portions radially positioned within said magnetic field, said coil portions encountering paths of different lengths across said magnet at differing angular positions during rotation of said actuator arm about said axis.

2. A voice coil motor for a disk drive, comprising:

an actuator arm supporting a read/write head at one end thereof, and rotatably supported for rotation about an axis;

a first pole piece arranged in a first plane perpendicular to said rotational axis;

a second pole piece arranged in a second plane in paralleley spaced relation parallel with said first pole piece and perpendicular to said rotational axis;

a permanent magnet mounted on one surface of said first pole piece to produce a magnetic field between said second pole piece and itself, said magnetic field having a magnetic flux path which includes an air gap wherein adjoining areas of oppositely directed magnetic flux define a magnetic flux transition zone, the top edge of said magnet being profiled in an irregular contour to shape the flux in the air gap in the transition zone, said irregular contour defining one or more lobes in the top edge of said magnet; and a moving coil supported by said actuator arm at the other end thereof and having coil portions radially positioned within said magnetic field, said coil portions encountering paths of different lengths across said magnet at differing angular positions during rotation of said actuator arm about said axis.

3. A voice coil motor for a disk drive, comprising:

an actuator arm supporting a read/write head at one end thereof, and rotatably supported for rotation about an axis;

a first pole piece arranged in a first plane perpendicular to said rotational axis;

a second pole piece arranged in a second plane in paralleley spaced relation parallel with said first pole piece and perpendicular to said rotational axis;

a permanent magnet mounted on one surface of said first pole piece to produce a magnetic field between said second pole piece and itself, said magnetic field having a magnetic flux path which includes an air gap wherein adjoining areas of oppositely directed magnetic flux define a magnetic flux transition zone, the bottom edge of said magnet being profiled in an irregular contour to shape the flux in the air gap in the transition zone, said irregular contour defining one or more lobes in the bottom edge of said magnet; and a moving coil supported by said actuator arm at the other end thereof and having coil portions radially positioned within said magnetic field, said coil portions encountering paths of different lengths across said magnet at differing angular positions during rotation of said actuator arm about said axis.

4. A voice coil motor for a disk drive, comprising:

an actuator arm supporting a read/write head at one end thereof, and rotatably supported for rotation about an axis;

a first pole piece arranged in a first plane perpendicular to said rotational axis;

a second pole piece arranged in a second plane in paralleley spaced relation parallel with said first pole piece and perpendicular to said rotational axis;

a permanent magnet mounted on one surface of said first pole piece to produce a magnetic field between said second pole piece and itself, said magnetic field having a magnetic flux path which includes an air gap wherein adjoining areas of oppositely directed magnetic flux define a magnetic flux transition zone, said magnet being profiled along one of the outer edges thereof in an irregular contour to shape the flux in the air gap in the transition zone, said irregular contour defining one or more lobes in said one of the outer edges of said magnet; and a moving coil supported by said actuator arm at the other end thereof and having coil portions radially positioned within said magnetic field, said coil portions encountering paths of different lengths across said magnet at differing angular positions during rotation of said actuator arm about said axis.

5. A voice coil motor for a disk drive, comprising:

an actuator arm supporting a read/write head at one end thereof, and rotatably supported for rotation about an axis;

a first pole piece arranged in a first plane perpendicular to said rotational axis;

a second pole piece arranged in a second plane in paralleley spaced relation parallel with said first pole piece and perpendicular to said rotational axis;

a permanent magnet mounted on one surface of said first pole piece to produce a magnetic field between said second pole piece and itself, said magnetic field having a magnetic flux path which includes an air gap wherein adjoining areas of oppositely directed magnetic flux define a magnetic flux transition zone, said magnet being profiled radially so that the cross-sectional thickness varies along a line extending radially from the lower edge of said magnet to the upper edge of said magnet, said first pole piece being profiled radially complementary to said magnet such that the cross-sectional thickness through said first pole piece and said magnet is uniform along a line extending radially from the lower edge of said magnet to the upper edge of said magnet, the combined thickness of said first pole piece and said magnet being consistent throughout, said profiling to shape the flux in the air gap in the transition zone; and a moving coil supported by said actuator arm at the other end thereof and having coil portions radially positioned within said magnetic field, said coil portions encountering a contoured flux field in said air gap due to the profiling of said magnet and said first pole piece.

6. A method for effectively reducing magnetic transition zone width in a voice coil motor for a disk drive having an actuator arm supporting a read/write head at one end thereof, and rotatably supported for rotation about an axis, said method comprising the steps of:

arranging a first pole piece in a first plane perpendicular to said rotational axis;

arranging a second pole piece in a second plane in paralleley spaced relation parallel with said first pole piece and perpendicular to said rotational axis;

mounting a permanent magnet on one surface of said first pole piece to produce a magnetic field between said second pole piece and itself, said magnetic field having a magnetic flux path which includes an air gap wherein adjoining areas of oppositely directed magnetic flux define a magnetic flux transition zone;

profiling the outer periphery of said magnet in an irregular contour to shape the flux in the air gap in the transition zone, said profiling defining one or more lobes in the outer periphery of said magnet;

supporting a moving coil by said actuator arm at the other end thereof; and radially positioning coil portions within said magnetic field such that said coil portions encounter paths of different lengths across said magnet at differing angular positions during rotation of said actuator arm about said axis.

7. A method for effectively reducing magnetic transition zone width in a voice coil motor for a disk drive having an actuator arm supporting a read/write head at one end thereof, and rotatably supported for rotation about an axis, said method comprising the steps of:

arranging a first pole piece in a first plane perpendicular to said rotational axis;

arranging a second pole piece in a second plane in paralleley spaced relation parallel with said first pole piece and perpendicular to said rotational axis;

mounting a permanent magnet on one surface of said first pole piece to produce a magnetic field between said second pole piece and itself, said magnetic field having a magnetic flux path which includes an air gap wherein adjoining areas of oppositely directed magnetic flux define a magnetic flux transition zone;

profiling the top edge of said magnet in an irregular contour to shape the flux in the air gap in the transition zone, said profiling defining one or more lobes in the top edge of said magnet;

supporting a moving coil by said actuator arm at the other end thereof; and radially positioning coil portions within said magnetic field such that said coil portions encounter paths of different lengths across said magnet at differing angular positions during rotation of said actuator arm about said axis.

8. A method for effectively reducing magnetic transition zone width in a voice coil motor for a disk drive having an actuator arm supporting a read/write head at one end thereof, and rotatably supported for rotation about an axis, said method comprising the steps of:

arranging a first pole piece in a first plane perpendicular to said rotational axis;

arranging a second pole piece in a second plane in paralleley spaced relation parallel with said first pole piece and perpendicular to said rotational axis;

mounting a permanent magnet on one surface of said first pole piece to produce a magnetic field between said second pole piece and itself, said magnetic field having a magnetic flux path which includes an air gap wherein adjoining areas of oppositely directed magnetic flux define a magnetic flux transition zone;

profiling the bottom edge of said magnet in an irregular contour to shape the flux in the air gap in the transition zone, said profiling defining one or more lobes in the bottom edge of said magnet;

supporting a moving coil by said actuator arm at the other end thereof; and radially positioning coil portions within said magnetic field such that said coil portions encounter paths of different lengths across said magnet at differing angular positions during rotation of said actuator arm about said axis.

9. A method for effectively reducing magnetic transition zone width in a voice coil motor for a disk drive having an actuator arm supporting a read/write head at one end thereof, and rotatably supported for rotation about an axis, said method comprising the steps of:

arranging a first pole piece in a first plane perpendicular to said rotational axis;

arranging a second pole piece in a second plane in paralleley spaced relation parallel with said first pole piece and perpendicular to said rotational axis;

mounting a permanent magnet on one surface of said first pole piece to produce a magnetic field between said second pole piece and itself, said magnetic field having a magnetic flux path which includes an air gap wherein adjoining areas of oppositely directed magnetic flux define a magnetic flux transition zone;

profiling one of the outer edges of said magnet in an irregular contour to shape the flux in the air gap in the transition zone, said profiling defining one or more lobes in said one of the outer edges of said magnet;

supporting a moving coil by said actuator arm at the other end thereof; and radially positioning coil portions within said magnetic field such that said coil portions encounter paths of different lengths across said magnet at differing angular positions during rotation of said actuator arm about said axis.

10. A method for effectively reducing magnetic transition zone width in a voice coil motor for a disk drive having an actuator arm supporting a read/write head at one end thereof, and rotatably supported for rotation about an axis, said method comprising the steps of:

arranging a first pole piece in a first plane perpendicular to said rotational axis;

arranging a second pole piece in a second plane in paralleley spaced relation parallel with said first pole piece and perpendicular to said rotational axis;

mounting a permanent magnet on one surface of said first pole piece to produce a magnetic field between said second pole piece and itself, said magnetic field having a magnetic flux path which includes an air gap wherein adjoining areas of oppositely directed magnetic flux define a magnetic flux transition zone;

profiling said magnet radially so that the cross-sectional thickness varies along a line extending radially from the lower edge of said magnet to the upper edge of said magnet;

profiling said first pole piece radially complementary to said magnet such that the cross-sectional thickness through said first pole piece and said magnet is uniform along a line extending radially from the lower edge of said magnet to the upper edge of said magnet, the combined thickness of said first pole piece and said magnet being consistent throughout, said profiling to shape the flux in the air gap in the transition zone;

supporting a moving coil by said actuator arm at the other end thereof; and radially positioning coil portions within said magnetic field such that said coil portions encounter a contoured flux field in said air gap due to the radial profiling of said magnet.

11. A voice coil motor for a disk drive, comprising:

an actuator arm supporting a read/write head at one end thereof, and rotatably supported for rotation about an axis;

a first pole piece arranged in a first plane perpendicular to said rotational axis;

a second pole piece arranged in a second plane in paralleley spaced relation parallel with said first pole piece and perpendicular to said rotational axis;

a permanent magnet mounted on one surface of said first pole piece to produce a magnetic field between said second pole piece and itself, said magnetic field having a magnetic flux path which includes an air gap wherein adjoining areas of oppositely directed magnetic flux define a magnetic flux transition zone;

said magnet being radially profiled so as to be thicker at an edge of said magnet distal from the end of said arm supporting said read/write head and thinner at an edge of said magnet proximal to the end of said arm supporting said read/write head;

said first pole piece being radially profiled complementary to the profiling of said magnet, said first pole piece being radially profiled so as to be thinner at an edge of said first pole piece distal from the end of said arm supporting said read/write head and thicker at an edge of said first pole piece proximal to the end of said arm supporting said read/write head, the combined thickness of said first pole piece and said magnet being consistent throughout;

a moving coil supported by said actuator arm at the other end thereof and having coil portions radially positioned within said magnetic field.

* * * * *